United States Patent [19]

Moriya

[11] Patent Number: 5,109,288
[45] Date of Patent: Apr. 28, 1992

[54] IMAGE READING APPARATUS

[75] Inventor: Shigeru Moriya, Osaka, Japan

[73] Assignee: Minolta Camera Kabushiki Kaisha, Osaka, Japan

[21] Appl. No.: 480,711

[22] Filed: Feb. 15, 1990

[30] Foreign Application Priority Data

Feb. 17, 1989 [JP] Japan .................................. 1-38655
Feb. 17, 1989 [JP] Japan .................................. 1-38656
Feb. 17, 1989 [JP] Japan .................................. 1-38657
Feb. 17, 1989 [JP] Japan .................................. 1-38658

[51] Int. Cl.$^5$ ............................................. H04N 1/04
[52] U.S. Cl. .................................... 358/497; 358/410; 358/413; 358/488
[58] Field of Search ............... 358/497, 413, 488, 409, 358/410

[56] References Cited

U.S. PATENT DOCUMENTS 4,519,697 5/1985 Takeda et al. .................. 358/8 R
4,731,657 3/1988 Miyagi .............................. 358/497

Primary Examiner—Edward L. Coles, Sr.
Attorney, Agent, or Firm—Burns, Doane, Swecker & Mathis

[57] ABSTRACT

An image reading apparatus includes a reading scanner for reading an image of an original while scanning the original, and a scanner sensor provided in an initial position for detecting the initial position of the scanner. The scanner starts scanning of the original from a scanning start position distant from the initial position in a predetermined direction, and the original is scanned in the predetermined direction from the scanning start position. When the scanner sensor detects the reading scanner after operation of the reading scanner, the operation of the scanner is stopped.

24 Claims, 11 Drawing Sheets

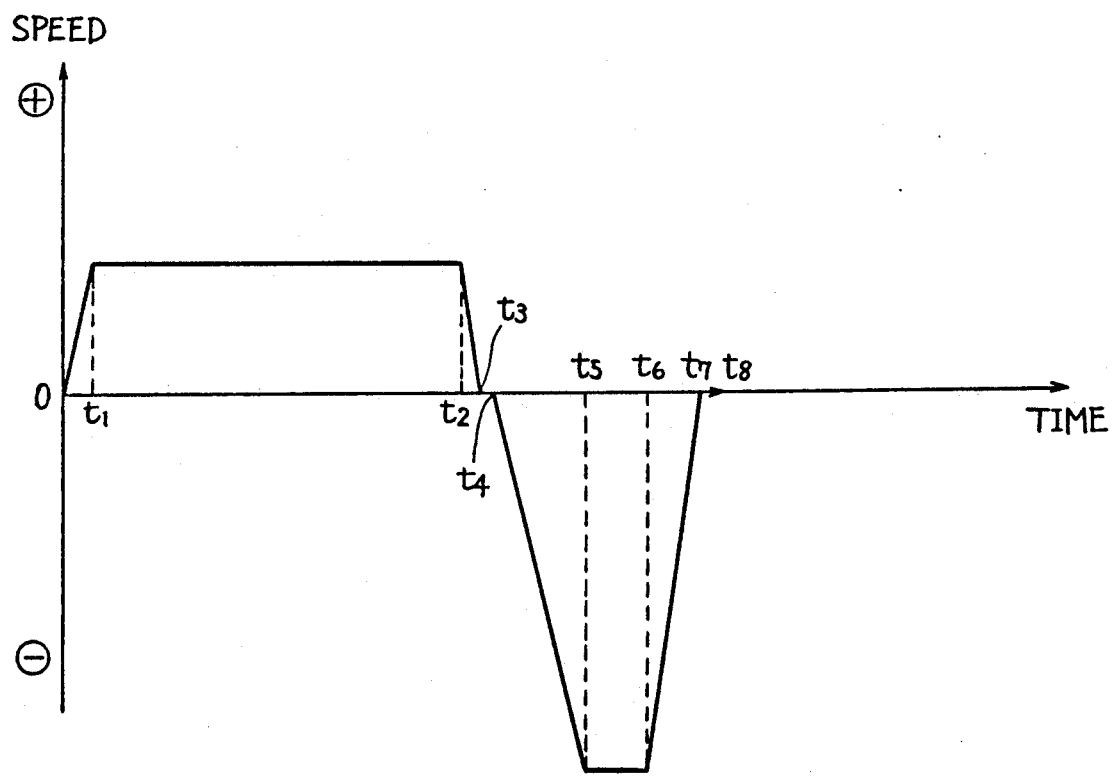

IMAGE READING APPARATUS

BACKGROUND OF THE INVENTION

1. Field of the Invention

The present invention relates to an image reading apparatus which reads an image of an original while scanning the original by a scanner, and particularly it relates to an image reading apparatus which detects abnormality in a position of the scanner.

2. Description of the Relates Art

In a copying apparatus using a conventional image reading apparatus, an image of an original is formed on a photoconductor drum while a scanner scans the original, and the image is transferred onto copy paper, so that the original is copied. Normally, the scanner has a predetermined initial position and it reads the original with reference to the initial position, in synchronization with supplied copy paper. Thus, in order to normally operate the copying apparatus, the scanner needs to be set always in the initial position before a start of copy operation. In order to reliably set the scanner in the initial position, a home position sensor for setting the scanner in the initial position is normally provided and a stepping motor, a DC servo motor or the like is used as a scanner motor. Hereinafter, an example of using a stepping motor will be specifically described. Particularly in a color copying apparatus of a face sequential printing system, scanning is performed for a plural number of times for respective colors and therefore it is important to register edges of the images formed by the respective scanning operations. For this reason, a stepping motor is adopted as the scanner motor. Thus, using the stepping motor, the registration is reliably performed by control of the numerical values.

However, a malfunction phenomenon might occur in the stepping motor. The malfunction phenomenon is a phenomenon that even if pulses for numerical value control are transmitted from a controller, the motor does not respond thereto. Such malfunction phenomenon occurs mainly in cases as described below.

(1) The rotation speed of the stepping motor and the load torque at that speed have a predetermined relation and if the load torque exceeds a limit in the predetermined relation, malfunction occurs. Such excess of the load torque over the limit is caused by incidents as described below (2) and (3).

(2) In case where the scanner is placed in a dusty spot, dust enters the slider of the scanner, causing malfunction.

(3) Normally the scanner moves along the rail fixed in the platen where the original is placed. If a heavy material is placed on the platen, deflection of the platen might occur. As a result, the rail of the scanner might warp, causing malfunction.

If a malfunction phenomenon as described above occurs, the position of the scanner cannot be controlled and it cannot be stopped at a predetermined stop position.

Since the copying apparatus using the conventional image reading apparatus is thus constructed, if malfunction occurs in the scanner, the scanner cannot be stopped in the predetermined position and it might collide with other components and the copying apparatus itself might be broken. In order to cope with such disadvantages, overrun sensors are conventionally provided at both ends of the moving course of the scanner so as to prevent overrun of the scanner beyond a predetermined moving range. In consequence, in the conventional copying apparatus, it is necessary to provide not only the home position sensor for setting the scanner in its initial position but also the overrun sensors for preventing malfunction.

SUMMARY OF THE INVENTION

Therefore, an object of the present invention is to cope with malfunction in an image reading apparatus without providing position sensors such as overrun sensors for detecting a position of a scanner, other than an initial position sensor.

Another object of the present invention is to detect even a very small malfunction in an image reading apparatus.

Still another object of the present invention is to enable operation in case of a very small malfunction in an image reading apparatus with a condition hardly causing further malfunction.

A further object of the present invention is to determine in an image reading apparatus whether an operation condition is a condition hardly causing malfunction, and to enable operation only when the operation condition is the condition hardly causing malfunction.

The above described objects of the present invention can be accomplished as described below. An image reading apparatus according to the present invention includes: an image reader for reading an image of an original, the image reader including a movable member for scanning the original; a drive unit for driving the movable member; a detector for detecting an initial position of the movable member; a setter for setting a scanning start position at a position distant from the initial position by a predetermined distance; a signal supplier for supplying a drive signal to the drive unit to cause reciprocating movement of the movable member with reference to the scanning start position; and a stop device for stopping operation of the drive unit when the detector detects the movable member during the reciprocating movement.

Since the image reading apparatus includes the above described elements, the sensor for detecting the initial position of the movable member also detects the reciprocating moving range of the movable member. Consequently, the image reading apparatus does not need to have, in addition to the initial position detector, other position detector such as an overrun sensor for detecting malfunction of the scanner.

According to another aspect of the present invention, an image reading apparatus includes: an image reader for reading an image of an original, the image reader including an movable member for scanning the original; a drive unit for driving the movable member; a first position setter for setting a first position where the movable member starts scanning; a supply device for supplying a drive signal to the drive unit to cause reciprocating movement of the movable member with reference to the first position; a second position detector for detecting a second position where the movable member terminates the reciprocating movement; and an abnormality detector for measuring a distance between the first and second positions, comparing the difference with a first predetermined value, and detecting abnormality of the apparatus when the difference exceeds the first predetermined value.

Since the image reading apparatus includes the above described elements, it is determined that the apparatus is in trouble when the difference between the scanning start position and the end position of the movable member is larger than the predetermined value. Consequently, in the image reading apparatus, a very small malfunction can be detected by setting a predetermined value.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a graph showing a relation between the time and speed in movement of a scanner.

DESCRIPTION OF THE PREFERRED EMBODIMENTS

A digital color copying apparatus according to an embodiment of the present invention will be described.

This copying apparatus converts an original image read by an image sensor to image data as a digital signal and prints (forms) an image on paper corresponding to the image data by an electrophotographic process.

Figure 1:
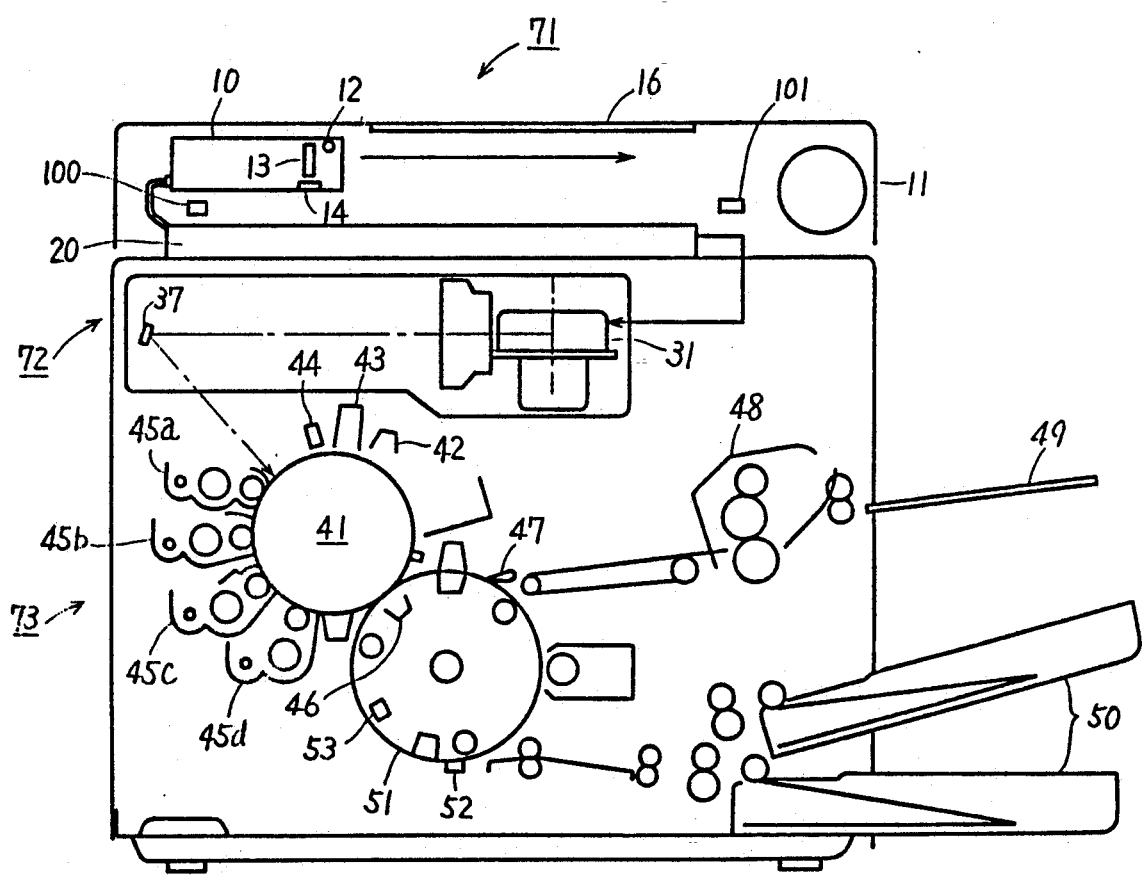
FIG. 1 is a front view showing an entire construction of a digital color copying apparatus.

Referring to FIG. 1, the digital color copying apparatus comprises: an image reading portion 71 for reading an image of an original and processing the read image; a scanning exposure portion 72 for changing the image signal read in the image reading portion 71 to a laser beam signal for recording the image signal; and an image recording portion 73 for copying the image of the original on copy paper by means of the laser beam outputted from the scanning exposure portion 72. The image reading portion 71 comprises: an original platen 16 on which an original is to be placed; a scanner 10 provided under the original platen 16 and including an image sensor 14 for reading the image of the original placed on the platen 16; a scanner motor 11 for driving the scanner 10; a sensor 100 for detecting a home position of the scanner 10; an overrun sensor 101 for detecting a position of the scanner 10 to prevent overrun of the scanner toward the scanner motor 11; and a signal processor 20 for processing the signal read by the scanner 10. The scanning exposure portion 72 comprises a printer head 31 for changing the signal processed by the signal processor 20 to a laser beam for recording the signal; and a reflector mirror 37 o which the laser beam reflects. The image recording portion 73 comprises: a photoconductor drum 41 for forming an electrostatic latent image by the laser beam reflected from the reflector mirror 37; a corona charger 43 provided over the external surface of the photoconductor drum 41 for charging the drum 41; developing devices 45a to 45d for developing the electrostatic latent image on the photoconductor drum 41; a transfer drum 51 for transferring the image on the photoconductor drum 41 to copy paper; a fixing device 48 for fixing the image transferred on the copy paper by the transfer drum 51; paper cassettes 50 for storing sheets of copy paper to be fed to the transfer drum 51; and an outlet tray 49 for storing the copy paper having the image fixed by the fixing device 48.

The scanner 10 comprises an exposure lamp 12 for irradiating the original; a rod lens array 13 for converging the light reflected from the original; and a color image sensor 14 such as contact type CCDs for converting the converged light to an electric signal.

Although the image reading unit according to this embodiment is of the type where the platen is fixed and the scanner is movable, the image reading unit may be of a type where the scanner is fixed and the platen is movable. In the latter case, the platen will be driven by a stepping motor.

Next, operation of the digital copying apparatus according to FIG. 1 will be described. When the original image is to be read, the scanner 10 is driven by the motor 11 and it scans the original on the platen 16. The moving direction of the scanner 10 (the arrow direction in FIG. 1) is a sub-scanning direction and the alignment direction of the image sensor 14 (the direction perpendicular to the paper surface of FIG. 1) is a main scanning direction.

The image of the original irradiated by the exposure lamp 12 is photoelectrically converted by the image sensor 14 and the read signal processor 20 converts the output to a print signal of any of the colors yellow, magenta, cyan and black.

Figure 2:
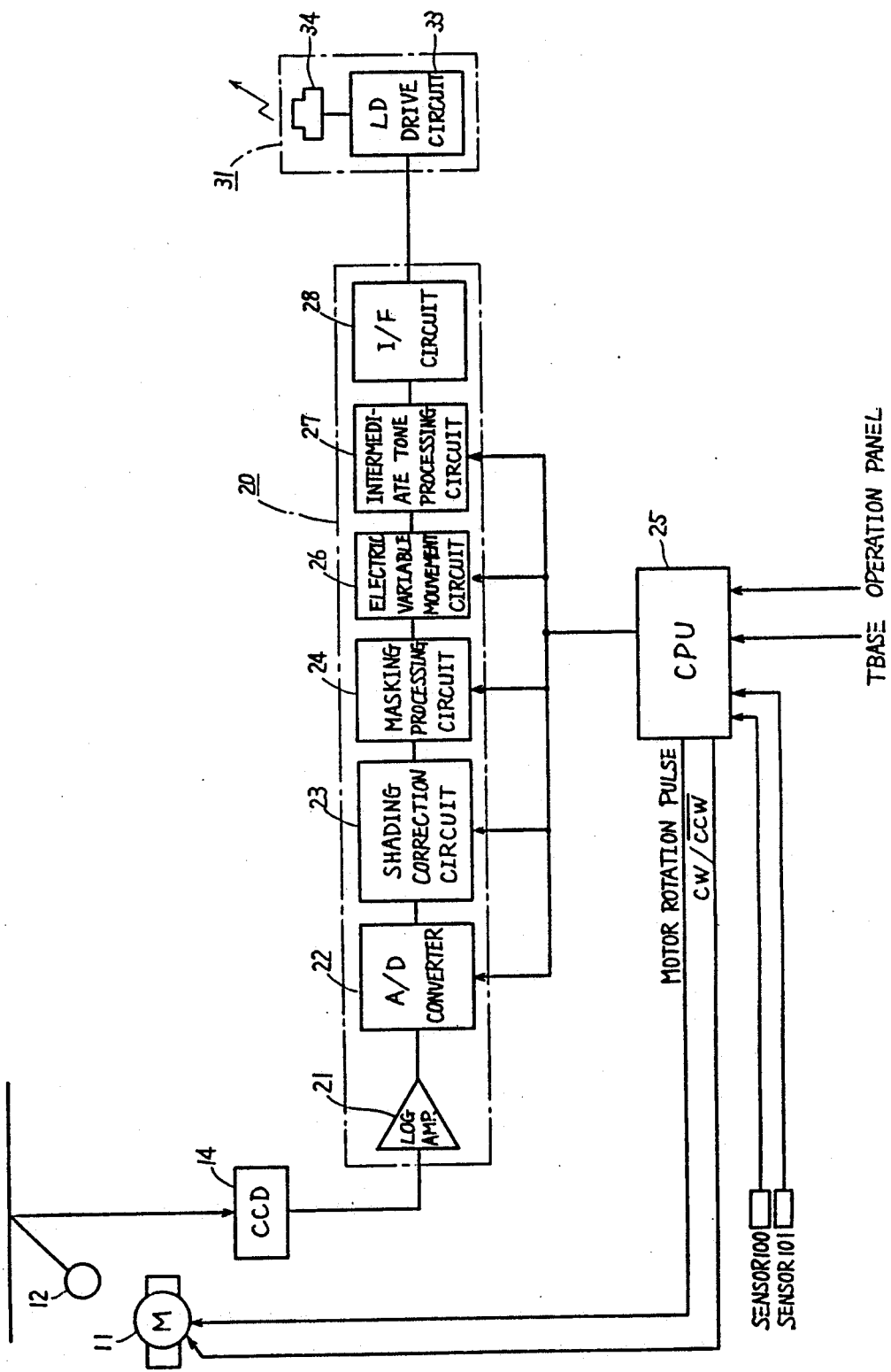
FIG. 2 is a block diagram showing a construction of a read signal processing portion 20.

In a printer head portion 31, a laser diode (LD) drive circuit 33 is operated in response to the print signal of each color from the signal processor 20 and a semiconductor laser 34 blinks (see FIG. 2).

A laser beam generated from the semiconductor laser 34 is reflected on the reflector mirror 37, so that the photoconductor drum 41 is exposed to the reflected beam. The surface of the photoconductor drum 41 is uniformly charged by the corona charger 43 and receives the above mentioned beam, whereby an electrostatic latent image is formed thereon. This electrostatic latent image is developed in any color of yellow, magenta, cyan and black by any of the developing devices 45a to 45d. The developed image is transferred onto the paper put on the round surface of the transfer drum 51 by means of the transfer charger 46. The above described process is repeated for one or more colors out of the colors yellow, magenta, cyan and black and after that the paper is separated from the transfer drum 51 by means of a separation claw 47 and the fixing device 48 fixes the image on the paper. Then, the paper is discharged to the outlet tray 49. During those steps, the scanner 10 repeats scanning operation in synchronization with the rotations of the photoconductor drum 41 and the transfer drum 51. The transfer drum 51 includes a position sensor 53 and the operation of the drum 51 is controlled in synchronization with the scanner 10 in response to a detection signal from the sensor 53. The diameter of the transfer drum 51 is larger than that of the photoconductor drum 41. This makes it easy for paper of a large size to be wound and set on the round surface of the transfer drum 51. Needless to say, the diameters of both drums may be equal.

The paper is fed by the paper cassette 50 and its leading edge is chucked by a chucking mechanism 52 provided in the transfer drum 51 so that deviation in position may not occur at the time of transfer for the respective colors. An eraser lamp 42 is provided near the corona charger 43.

FIG. 2 is a block diagram showing the construction of the read signal processor 20. The respective image signals of the three colors red (R), green (G), blue (B), obtained by the photoelectric conversion in the image sensor 14 are operationally amplified to signals of magnitudes corresponding to image densities by means of a log amplifier 21. The reason that the log amplifier 21 is provided is as follows. The image signal received by the CCDs from the original is in a proportional relation with the reflectance of the original. Accordingly, in order to convert the reflectance to the image signal, it is necessary to convert the reflectance to density. Generally, the logarithm of the reflectance is proportional to the density, the reflectance detected by the CCDs is converted to the density by using the log amplifier 21. Then, it is converted to a digital signal by means of an A/D converter 22. This digital signal is an image signal (image data) having gradation. Then shading correction is applied thereto by a shading correction circuit 23.

Next, a masking processing circuit 24 generates, from the respective image signals of the three colors R, G, B, image signals (print signals) for printing corresponding to the respective print colors of yellow (Y), magenta (M), cyan (C) and black (B) according to the characteristics of the toners of the developing devices 45a to 45d.

Which color out of the above mentioned colors a print signal to be generated has is determined successively in response to a control signal from a CPU 25. Various key input signals are inputted to the CPU 25 from an operation panel, not shown, and, at the same time, a detection signal $\overline{TBASE}$ is inputted from the position sensor 53 in the transfer drum 51. Based on this detection signal, the CPU 25 outputs a control signal for controlling the motor 11 for driving the scanner 10. Signals from a sensor 100 for detecting the home position of the scanner 10 and from a sensor 101 for detecting overrun of the scanner 10 are also inputted to the CPU 25.

The sensor 100 functions as a home position sensor at the time of turning on the power supply but in other cases (i.e., during scanning of the scanner 10), the sensor 100 is not turned on.

An electric variable magnification movement circuit 26 performs magnification changing operation in the irradiation direction and moving operation in the moving direction. By providing an output for the same area repeatedly for plural times in the electric variable magnification movement circuit 26, it is possible to output a plural number of same images in the scanning direction.

An intermediate tone processing circuit 27 performs binary processing of the print signal from the masking processing circuit 24 by using for example a dither method, thereby generating a binary pseudo intermediate tone signal. The signal thus processed is inputted to the LD drive circuit 33 through an I/F circuit 28. The I/F circuit 28 has a line memory for storing image data for a unit of a line. This line memory has a capacity for two lines so that read operation and write operation can be performed simultaneously. The LD drive circuit 33 blinks the semiconductor laser 34 according to the signal data. The beam generated by the semiconductor laser 34 is applied to the photoconductor drum 41 by means of the reflector mirror 37 as shown in FIG. 1. Thus, an electrostatic latent image is formed on the photoconductor drum 41.

Next, scanner control of the digital color copying apparatus having the above described construction will be described. In the digital color copying apparatus of the present embodiment having a line memory and not having a full-screen memory, it is necessary to drive the scanner 10 and the transfer drum 51 in synchronization. According to this embodiment, the photoconductor drum 41 and the transfer drum 51 are rotated at low speed and a start of scanning operation of the scanner 10 is controlled according to the operation of the transfer drum 51, whereby the scanner 10 and the transfer drum 51 are synchronized. For this purpose, the position sensor 53 provided in the transfer drum 51 detects the rotation of the transfer drum 51 and the detection signal $\overline{TBASE}$ is supplied from the position sensor 53 to the CPU 25. The CPU 25 controls the motor 11 to drive the scanner 10 so that a leading edge of the original image can be read after an elapse of predetermined time from a rise of the signal $\overline{TBASE}$.

In this case, if the magnification in the sub-scanning direction is changed, the substantial rise time of the scanner 10 is changed accordingly. Therefore, it is necessary in view of the change in the rise time of the scanner 10 to shift a start timing of the scanner 10 according to the magnification, or to shift the home position of the scanner 10, or to make a composite correction combining those shifting methods.

Figure 3A:
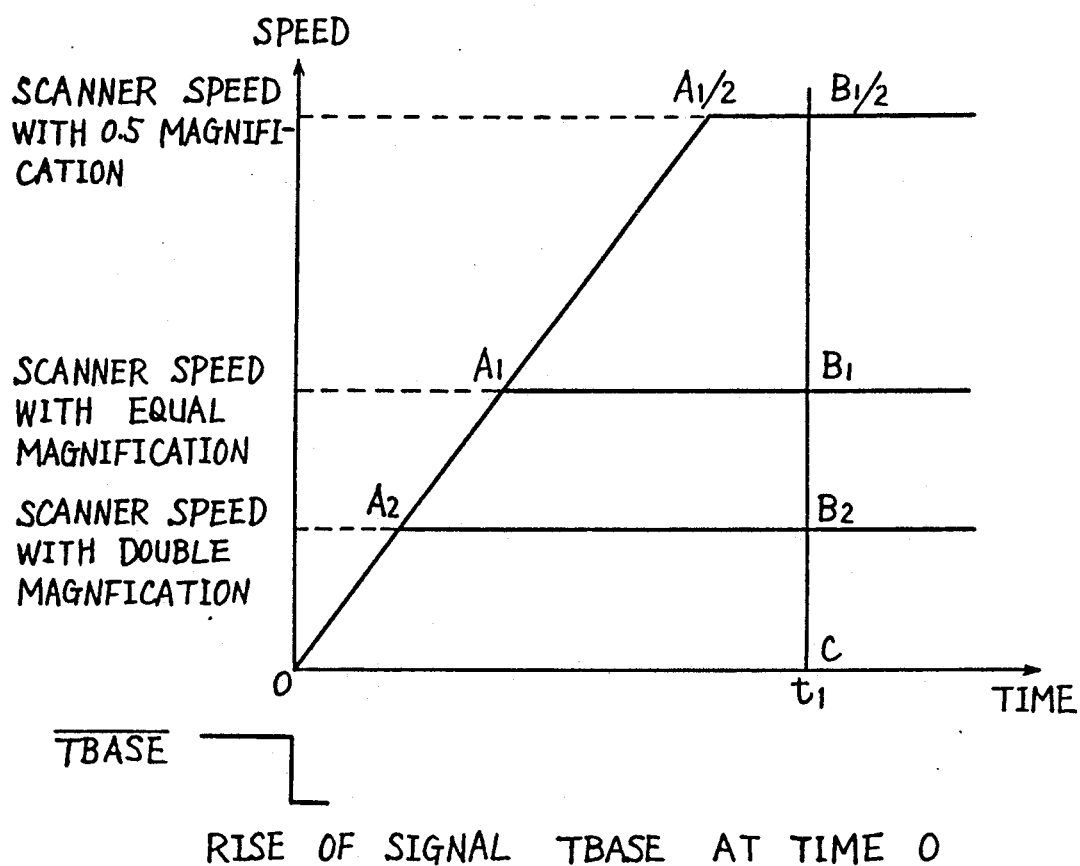
FIG. 3A is a timing chart in the case of correction by shifting a home position of a scanner.
Figure 3B:
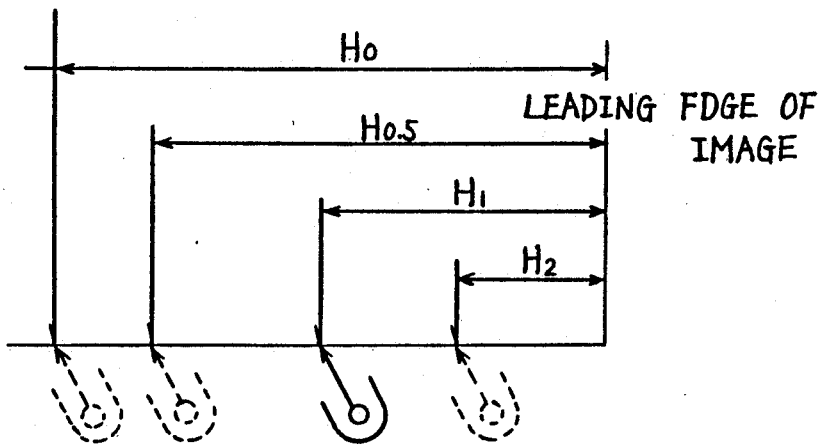
FIG. 3B is a diagram showing a positional relation between a leading edge of an image in each magnification and a home position.

FIG. 3A is a timing chart in the case of making the correction by using the method of shifting the home position of the scanner 10. At the rise of the signal $\overline{TBASE}$, the scanner 10 immediately starts to operate. The home position of the scanner 10 as the position for starting the operation differs dependent on the magnification. For example, if the home position in the case of an equal-scale magnification is $H_1$, the home position $H_{0.5}$ in the case of the magnification 0.5 is away from the leading edge position of the image by an amount corresponding to a quadrangle $A_1 A_{\frac{1}{2}} B_{\frac{1}{2}} B_1$ (representing a distance by time $\times$ speed), and the home position $H_2$ in the case of the magnification 2 is a position nearer to the leading edge position by a distance corresponding to a quadrangle $A_2 A_1 B_1 B_2$ (as shown in FIG. 3B). The rise of the signal $\overline{TBASE}$ does not necessarily need to coincide with the time 0 and it may only be before the time 0. Thus, by controlling the start of operation of the scanner 10, it is possible to start scanning operation with respect to the leading edge of the original image after a predetermined time from the fall of the signal $\overline{TBASE}$, thereby enabling the print head portion 31 to start printing at that time. A relation between the moving speed of the scanner 10 and the time is shown in FIG. 4. Referring to FIG. 4, the X axis represents the time and the Y axis represents the speed. The negative range of the Y axis represents the negative direction of the speed. Referring to FIG. 4, the scanner 10 rising up to a low scanning speed at time t1 scans over a scanner length (until t2) obtained from the original size. After the scanning (at time t3), the scanner 10 is immediately accelerated in the opposite direction (from time t4 to t5) and returns at high speed (from time t5 to t6) to the home position and stops (at time t7).

Next, specified control in case of malfunction of the scanner 10 of the digital color copying apparatus will be described with reference to the flowchart.

Figure 5:
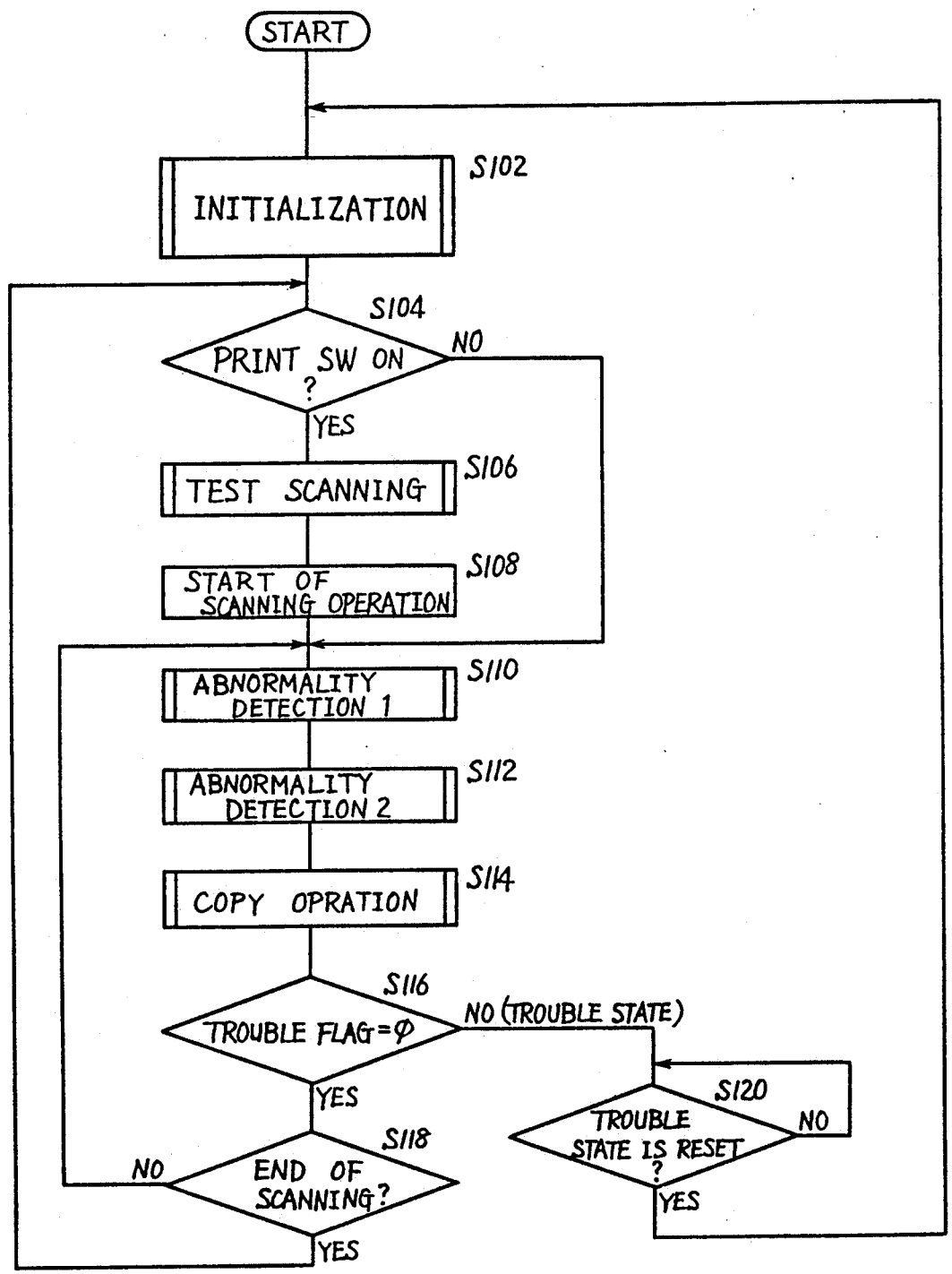
FIG. 5 is a main flowchart for detecting a malfunction state of the scanner.

FIG. 5 is a flowchart representing a main routine indicating processing for detecting a malfunction state of the scanner 10 of the digital color copying apparatus.

Referring to FIG. 5, when the power supply of the digital color copying apparatus is turned on, the scanner 10 is initialized so that the scanner 10 is in a state ready for reading an original (in S102). Next, it is determined whether the print switch is on or not (in S104). If it is on, test scanning (in S106) is performed to determine whether the scanner 10 is in the state ready for reading the original, and scanning operation is started (in S108). Then, abnormality detection 1 (in S110) for detecting whether the scanner 10 is in an overrun state or not, abnormality detection 2 (in S112) for determining whether the scanner 10 starts to operate normally or not, and real copy operation (in S114) are performed. If the print switch is not on in step S104, the processing flow proceeds to the abnormality detection 1 (in S110). After the copy operation (in S114) is terminated, a trouble flag is checked (in S116) to determine whether the scanner 10 is in a trouble state due to malfunction. If the scanner 10 is not in a trouble state (YES in S116), it is determined whether the scanning operation is terminated or not (in S118). If the scanning operation is terminated (YES in S118), the processing flow proceeds to determination processing (in S104) for determining whether the print switch is on or not. If the scanning operation is not terminated in step S118, the processing flow proceeds to the abnormality detection 1 (in S110). If it is determined in step S116 that the scanner 10 is in a trouble state (NO in S116), it is determined whether the trouble state is recovered or not (in S120). If the trouble state is recovered in step S120, the processing flow proceeds to the initialization subroutine (in S102). If the trouble state is not recovered (NO in S120), the processing stops until the trouble state is recovered.

Next, details of the respective subroutines shown in FIG. 5 will be described.

Figure 6:
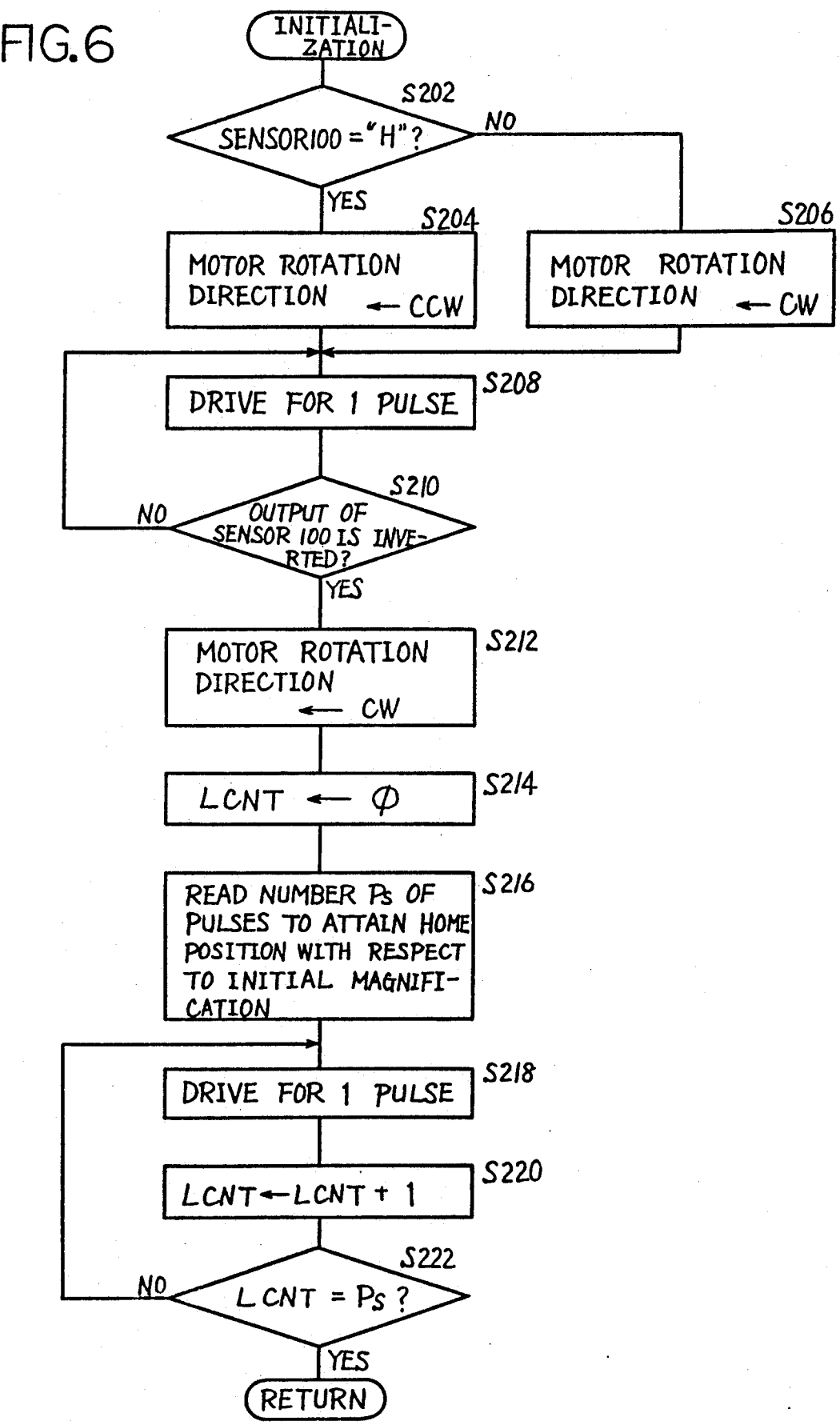
FIG. 6 is a flowchart showing an initialization subroutine of the scanner.

FIG. 6 is a flowchart showing details of the initialization subroutine in step S102 in FIG. 5.

It happens that the scanner 10 is not in the home position when the power supply of the digital color copying apparatus is turned on. In such a case, return of the scanner 10 to the home position is started at first. The home position where the scanner 10 returns is a position more distant from the leading edge of the image than a scanning start position in the case of the minimum magnification (i.e., the case of the fastest scanning speed). The scanning start position corresponds to the position shown by $H_0$ in FIG. 3. In order to accomplish such operation, a sensor 100 is provided in the home position of the scanner 10 to transmit, to the CPU 25, a logical low ("L") signal if the position of the reader of the scanner 10 exists in the above mentioned position $H_0$ or in a position more distant from the leading edge of the image, or a logical high ("H") signal if the above mentioned position exists in a position near the leading edge of the image from the position $H_0$ (as shown in FIG. 1). By using the sensor 100, the scanner 10 moves to the position $H_0$ at the time of turning on the power supply and then it moves to the home position corresponding to a predetermined magnification.

The above described procedures will be described with reference to the flowchart shown in FIG. 6. In FIG. 6, the characters CW represent the regular rotation direction (i.e., the scanning direction of the scanner 10), and the characters CCW represent the reverse rotation direction (i.e., the returning direction of the scanner 10).

At first, it is determined whether the sensor 100 outputs the "H" signal or not (in S202). If the sensor 100 outputs the "H" signal, which means the case where the reader of the scanner 10 exists in a position approaching the leading edge of the image from the position $H_0$, the scanner motor 11 is rotated in the reverse direction (in S202) and the scanner 10 is driven for one pulse (in S208). Then, it is determined whether the output of the sensor 100 is inverted or not (in S210). If the output of the sensor 100 is inverted in step S210, which means that the position of the reader of the scanner 10 reaches the position $H_0$, the scanner 10 is ready for reading an image. On this occasion, 0 is substituted into a counter LCNT indicating the position of the scanner 10. The content of the counter LCNT is incremented by 1 when the scanner motor 11 moves by one pulse in the scanning direction and it is decremented by 1 when the motor 11 moves by one pulse in the returning direction. Then, the number of pulses Ps to attain the home position of the scanner with respect to the initial magnification inputted in advance in the CPU 25 from the operation panel is read (in S216). Since the home position of the scanner 10 with respect to the initial magnification is always in the scanning direction, the scanner motor 11 drives the scanner 10 for one pulse in the scanning direction (in S218). At the same time, the value of the counter LCNT is incremented by 1 (in S220). This procedure is repeated until the value of the counter LCNT is equal to the number of pulses Ps to attain the home position (in S222).

If NO is determined in step S202, which means the case where the position of the reader of the scanner 10 is in a position more distant from the leading edge of the image than the position $H_0$, the rotation direction of the scanner motor 11 is set to the scanning direction (in S206) and the scanner motor 11 drives the scanner 10 for one pulse (in S208). If the output of the sensor 100 is not inverted in step S210, the scanner motor 11 drives the scanner 10 for one pulse in the motor rotation direction (in S208).

Next, details of abnormality detection in scanner drive shown in S110 and S112 in FIG. 5 will be described. Since a stepping motor is used as the scanner motor, if the home position is defined at the time of turning on the power supply, the scanner 10 can be controlled thereafter with numerical values by the CPU 25. However, if an unexpected change in load should occur, a malfunction phenomenon would occur. In such a case, it is difficult for the CPU 25 to detect abnormality in scanner drive at once. Therefore, according to this embodiment, detection of abnormality due to a malfunction phenomenon etc. is performed by using the sensors 100 and 101 shown in FIG. 1. Items of abnormality detection are as follows.

Abnormality detection 1: if the "L" signal is provided from the sensors 100, 101 during the drive of the scanner 10, generation of pulses is stopped and the brake is applied on the scanner motor 11. The display portion of the copying apparatus displays a trouble state of the apparatus.

Abnormality detection 2: After an end of scanning, the scanner 10 is driven to the position $H_0$ with predetermined timing and if the value of the counter LCNT at that time is larger than a permissible error, a malfunction phenomenon is regarded as having occurred and correction processing is performed.

Figure 7:
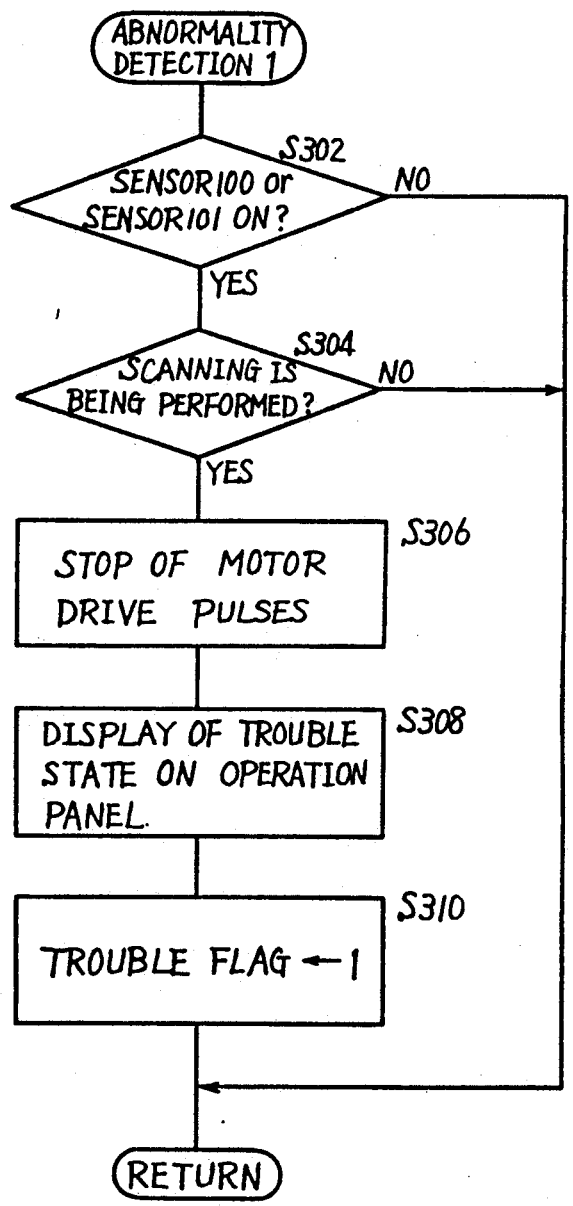
FIG. 7 is a flowchart showing a subroutine of abnormality detection 1.

Referring to FIG. 7, the flowchart of the abnormality detection 1 will be described in detail. The sensor 100 is not turned on normally; it is turned on only at the time of turning on the power supply as described above. The sensor 101 is also adapted not to turn on normally.

Referring to FIG. 7, in the flow of the abnormality detection 1, it is determined first whether the sensor 100 or the sensor 101 is on or not (in S302). Then, it is determined whether scanning operation is being performed or not (in S304). As described previously, the sensors 100 and 101 are both adapted not to turn on normally during the scanning operation. Accordingly, if those sensors are turned on, it can be determined that abnormality occurs. Accordingly, if YES is determined in step S304, the motor drive pulses of the scanner motor 11 are stopped (in S306). The operation panel of the copying apparatus turns on a display indicating that the copying apparatus is in a trouble state (S308). Then, 1 is set in the trouble flag indicating that the copying apparatus is in a trouble state (in S310).

If NO is determined in step S302 and step S304, the processing flow returns since the copying apparatus is not in a trouble state.

Figure 8:
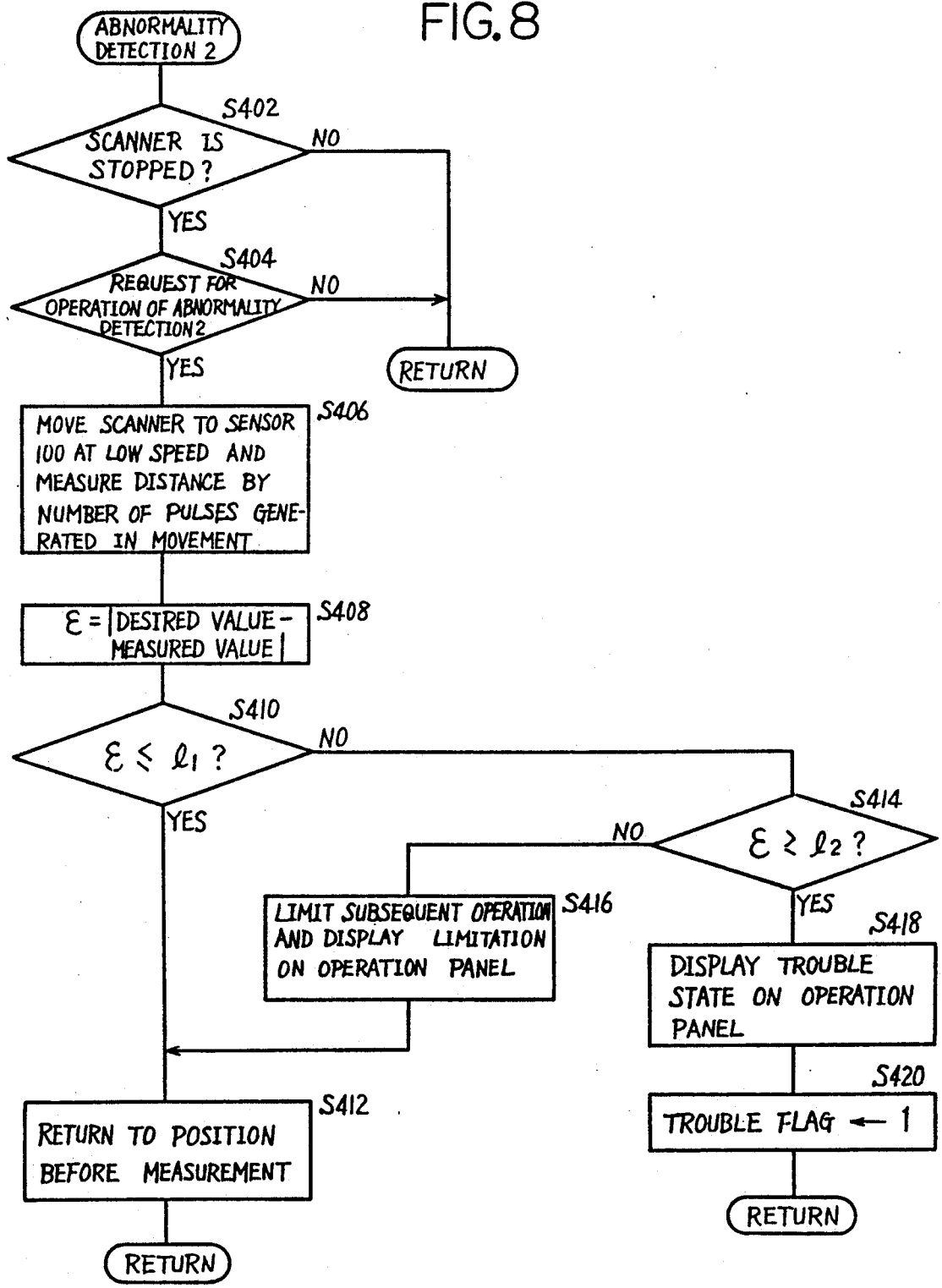
FIG. 8 is a flowchart showing a subroutine of abnormality detection 2.

Next, the abnormality detection 2 will be described. If a malfunction phenomenon does not occur, a distance between the scanning start position and the sensor 100 with a predetermined magnification should be considered to be constant in principle. Therefore, the scanner 10 is really moved with predetermined timing and the number of moving steps from the scanning start position until turn-on of the sensor 100 is counted, whereby the distance of movement is measured. On that occasion, the scanner 10 is driven at a sufficiently low speed which will not cause malfunction phenomenon. It is determined whether the scanner 10 is in a malfunction state or not based on a difference between the distance obtained by the measurement and a predetermined desired value. This processing will be described with reference to the flowchart of the abnormality detection 2 shown in FIG. 8. In the flow of the abnormality detection 2, it is determined at first whether the scanner 10 is in a stop state or not (in S402). If the scanner 10 is in a stop state (YES in S402), it is determined whether operation for the abnormality detection 2 is requested or not (in S404). If the operation for the abnormality detection 2 is requested (YES in S404), the scanner 10 is driven at low speed by the scanner motor 11 to the position of the sensor 100 and a distance is measured by the number of pulses in that period (in S406). Then, a difference $\epsilon$ between the predetermined desired value and the value of measurement obtained in step S406 is calculated (in S408). It is determined whether the difference $\epsilon$ is equal to or smaller than a value $l_1$ sufficiently close to 0 within a measurement error range (in S410). If the difference $\epsilon$ is equal to or smaller than $l_1$ (YES in S410), the scanner 10 is determined to be in a normal state and it is returned again to the scanning start position (in S412). If it is determined in step S410 that the difference $\epsilon$ is larger than $l_1$, it is determined whether or not the difference $\epsilon$ is equal to or larger than a predetermined value $l_2$ (in S414). If it is determined in step S414 that the difference $\epsilon$ is equal to or larger than the predetermined value $l_2$ (YES in S414), it is determined that uncorrectable malfunction occurred, and in the same manner as in the abnormality detection 1, a display indicating that the copying apparatus is in a trouble state is turned on in the operation panel of the copying apparatus (in S418). Then, the trouble flag for displaying occurrence of trouble is set to 1 (in S420). If it is determined in step S414 that the difference $\epsilon$ is smaller than the predetermined value $l_2$, it is determined that correctable malfunction occurred, and a limitation is applied to a subsequent operation and then it is indicated by turn-on of a display that the limitation is applied to the scanning portion of the copying apparatus (in S416). The scanner 10 is returned to the position set before the measurement (in S412).

Figure 9:
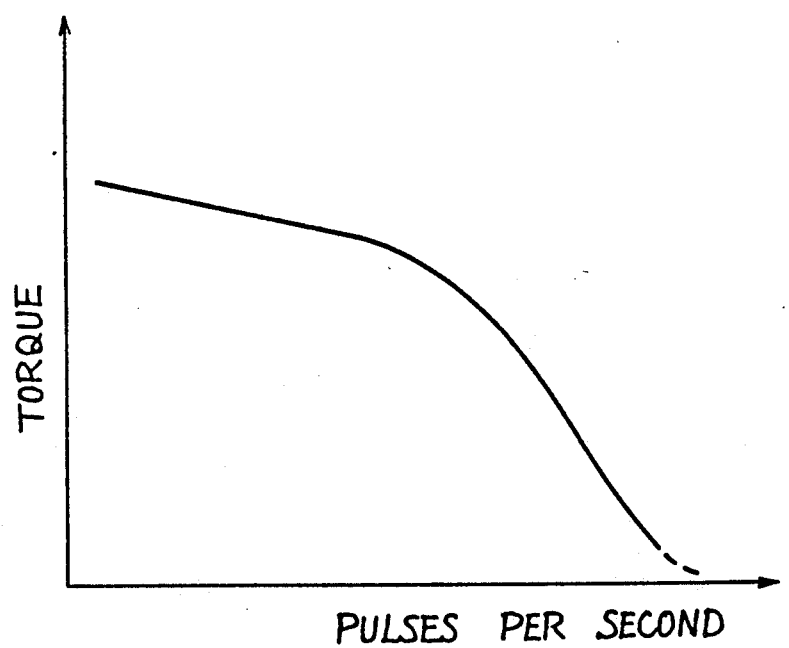
FIG. 9 is a graph showing a relation between the number of pulses per second and the torque of a stepping motor.

Next, the above described correction operation will be described. FIG. 9 is a graph showing a relation between the number of pulses and torque of a stepping motor generally used as the scanner motor 11. The X axis represents the number of pulses per second and the Y axis represents the torque. Referring to FIG. 9, the higher the rotation speed of the motor is, the lower the output torque is. This means that there is least allowance for torque in an acceleration stage near the time shown by t5 in FIG. 4 and in a deceleration stage immediately after the time shown by t6 in FIG. 4. Fundamentally, the scanner motor 11 is designed to ensure a sufficient allowance for torque in those stages, but it may be considered that some malfunction occurs in those stages due to unexpected change in load. Such malfunction can be avoided by reducing the acceleration and deceleration speeds at the time of return (namely, by prolonging the period between t4 to t5) or by lowering the returning speed of the scanner 10. In such a case, disadvantages as described below would be caused. The time t8 for terminating the return is delayed making it impossible to complete scanner operation in which the return should be terminated for one rotation of the transfer drum 1, and consequently it is necessary to apply idling of the transfer drum 1 in the subsequent copy process. Therefore, a warning display is turned on in the operation panel to warn the user about that.

In the case of a small magnification in read scanning, the scanner 10 is driven with a speed curve similar to the speed curve in the return. In this case, if the acceleration speed is reduced, the period from 0 to t1 is prolonged to cause a disadvantage that the acceleration of the scanner 10 cannot be terminated within the period from the rise of the signal $\overline{TBASE}$ to attainment of a resist position. In addition, since the distance required for the acceleration is increased, it is necessary to design a large sized copying apparatus. In view of the above described points, it is necessary to limit the use of the copying apparatus with a small magnification. For example, in the case of a copying apparatus originally designed to be used in a range of magnifications 0.5 to 4, the use is limited to a range of magnifications 0.7 to 4 in case of correction of a malfunction state and this limitation is displayed as a warning in the operation panel in the same manner as in the above described example.

Measurement for the abnormality detection 2 may be carried out after a predetermined time from an end of the previous copy operation for example (e.g., at the time of automatic clearing if the copying apparatus is an apparatus having an auto clear mode). Instead, operation for the abnormality detection 2 may be requested through the operation panel when the user receives deviation of respective colors in the sub-scanning direction while watching the image. Alternatively, the above described two methods may be used in combination.

Next, text scanning will be described. The test scanning is a scanning operation for determining whether a malfunction phenomenon can be really suppressed or not under the situation that a limitation is imposed on the copying magnification or the acceleration of the scanner as described above when the scanner of the copying apparatus is in a malfunction state. When the copy switch is turned on for the first time after the limitation is imposed, scanning operation is performed at first with the minimum magnification within the limitation range before copy paper is fed. Then, after return of the scanner 10, the distance between the scanner 10 and the sensor 100 is measured. If it is determined based on the result of the measurement that no malfunction occurs, the flow proceeds to the copy process. Presence or absence of malfunction may be determined by carrying out pre-scanning in an operation mode each time the copy switch is turned on, after the limitation is imposed. If presence of malfunction in the scanner is detected by the above described test scanning, the copying apparatus is regarded as being in a trouble state and the subsequent copy operation is stopped.

Figure 10:
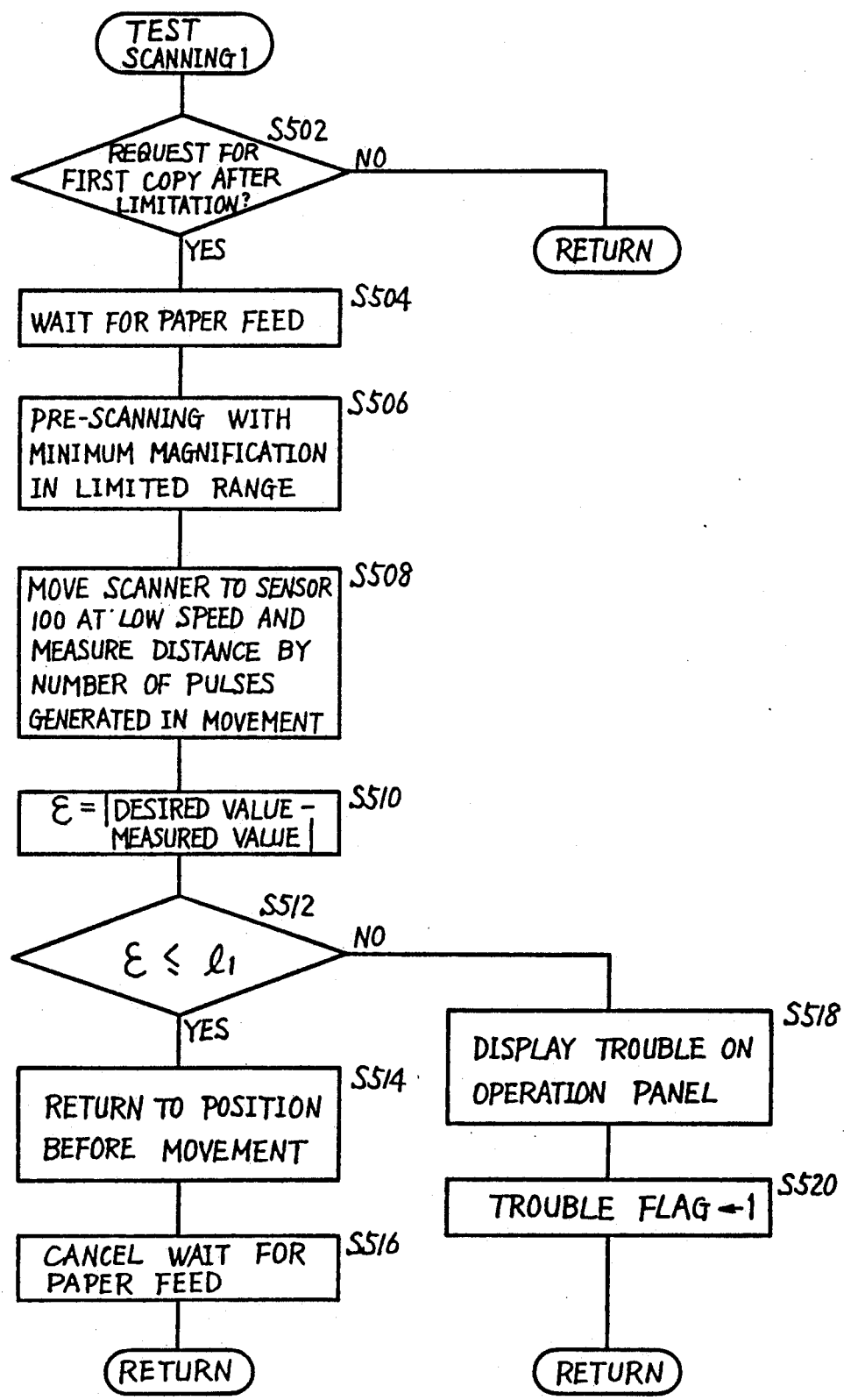
FIG. 10 is a flowchart showing a subroutine of test scanning 1.

The above described procedures will be specifically described with reference to the test scanning flowcharts in FIGS. 10 and 11. FIG. 10 is a flowchart showing processing of test scanning 1. In the test scanning 1, it is determined whether the copy request is the first request after the limitation (in S502). If it is determined in step S502 that the copy request is the first copy request (YES), paper is not fed at first (in S504). Then, pre-scanning of the scanner 10 is carried out with the minimum magnification within the limitation range (in S506). Subsequently, the scanner 10 is moved to the position of the sensor 100 and the distance corresponding to a difference of the positions is measured by the number of pulses generated in this movement (in S508). The difference value $\epsilon$ is represented as a difference between a predetermined desired value and a measured value (in S510). Then, it is determined whether or not the difference $\epsilon$ is equal to or smaller than $l_1$ close to zero for example and within a measurement error range (in S512). If the difference $\epsilon$ is equal to or smaller than $l_1$ (YES in S512), the scanner 10 is returned to the position set before the measurement (in S514) and the temporary stop of paper feeding in step S504 is cancelled (in S516). If the difference $\epsilon$ is larger than $l_1$ in step S512, a display is turned on in the operation panel of the copying apparatus indicating that the copying apparatus is in trouble (in S518) and the trouble flag is set to 1 for display of the trouble (in S520).

If the copy request it not the first request after the limitation in step S502, the processing flow returns.

Figure 11:
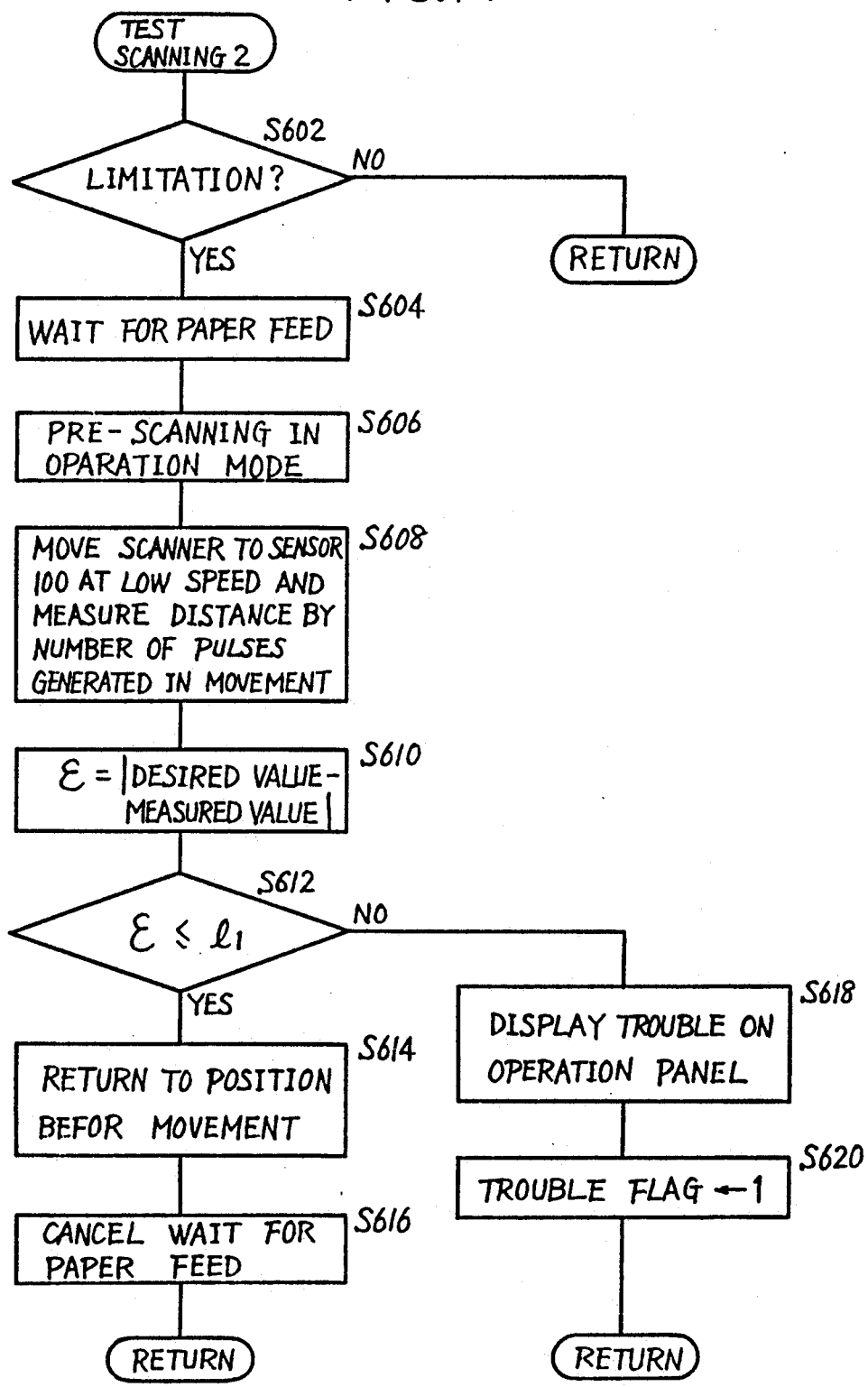
FIG. 11 is a flowchart showing a subroutine of test scanning 2.

FIG. 11 is a flowchart showing a second test scanning method in correction operation.

Referring to FIG. 11, according to the second test scanning method, it is determined at first whether any limitation is applied to the scanner 10 (in S602). If it is determined limitation is applied (YES in S602), paper feed wait processing (in S604) for temporarily stopping paper feeding is performed and pre-scanning is carried out in the operation mode (in S606). The scanner 10 is moved to the position of the sensor 100 at a low speed not causing malfunction and the number of pulses generated on that occasion is measured, so that the distance to the predetermined position is measured (in S608). Then, a difference $\epsilon$ between a predetermined desired value and the measured value obtained in S608 is calculated (in S610). Next, it is determined whether the difference $\epsilon$ is equal to or smaller than a predetermined value $l_1$ close to zero within a measurement error range (in S612). If the difference $\epsilon$ is equal to or smaller than the predetermined value $l_1$ (YES in S612), the scanner 10 is returned to the position set before the measurement (in S614) and the paper feed wait processing in step S604 is cancelled (in S610). If the difference is larger than the predetermined value $l_1$ in step S612 (NO), a display is turned on in the operation panel of the copying apparatus indicating that the copying apparatus is in trouble (in S618) and the trouble flag for trouble display is set to 1 (in S620).

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image reading apparatus for reading an image of an original, comprising:
   image reading means for reading the image of the original, said image reading means including a movable member which reciprocates within a scanning range for scanning said original, said scanning means being located at a initial position which is outside said scanning range before a scanning operation;
   drive means for driving said movable member;
   detecting means for detecting presence of said movable member at the initial position;
   setting means for setting a scanning start position at a position distant from said initial position by a predetermined distance;
   signal supply means for supplying a drive signal to said drive means to move the movable member from the initial position to the scanning start position before initiating reciprocating movement of the movable member and to cause reciprocating movement of said movable member within the scanning range with reference to said scanning start position; and
   means for stopping operation of said drive means when said detecting means detects said movable member at the initial position during said reciprocating movement.

2. An image reading apparatus in accordance with claim 1, wherein
   said drive means includes a stepping motor;
   said setting means sets the predetermined distance based on a preset number of pulses; and
   said signal supply means generates a periodic pulse signal to be supplied to said stepping motor.

3. An image reading apparatus for reading an image of an original, comprising:
   image reading means for reading the image of the original, said image reading means including a movable member for scanning said original;
   drive means for driving said movable member, said drive means includes a stepping motor;
   detecting means for detecting an initial position of said movable member;
   setting means for setting a scanning start position at a position distance from said initial position by a predetermined distance, said setting means sets the predetermined distance based on a preset number of pulses;

signal supply means for supplying a drive signal to said drive means to cause reciprocating movement of said movable member with reference to said scanning start position, said signal supply means generates a periodic pulse signal to be supplied to said stepping motor; and means for stopping operation of said drive means when said detecting means detects said movable member during said reciprocating movement.

4. A color copying apparatus for reading an image of a color original a plurality of times for respective colors and forming a color image, comprising:

image reading means for reading the image of the original, said image reading means including a movable member which reciprocates within a scanning range for scanning said original, said scanning means being located at a initial position which is outside said scanning range before a scanning operation;

drive means for driving said movable member;

detecting means for detecting presence of said movable member in an initial position;

setting means for setting a scanning start position at a position distant from said initial position by a predetermined distance;

signal supply means for supplying a drive signal to said drive means to move the movable member from the initial position to the scanning start position before initiating reciprocating movement of the movable member and to cause reciprocating movement of said movable member within the scanning range with reference to said scanning start position; and means for stopping operation of said drive means when said detecting means detects said movable member at the initial position during said reciprocating movement.

5. A color copying apparatus in accordance with claim 4, wherein:

said drive means includes a stepping motor;

said setting means sets the predetermined distance based on a preset number of pulses; and said signal supply means generates a periodic pulse signal to be supplied to said stepping motor.

6. A color copying apparatus for reading an image of a color original a plurality of times for respective colors and forming a color image, comprising:

image reading means for reading the image of the original, said image reading means including a movable member for scanning said original;

drive means for driving said movable member, said drive means includes a stepping motor;

detecting means for detecting presence of said movable member in an initial position;

setting means for setting a scanning start position at a position distant from said initial position by a predetermined distance, said setting means sets the predetermined distance based on a preset number of pulses;

signal supply means for supplying a drive signal to said drive means to cause reciprocating movement of said movable member with reference to said scanning start position, said signal supply means generates a periodic pulse signal to be supplied to said stepping motor; and means for stopping operation of said drive means when said detecting means detects said movable member during said reciprocating movement.

7. An image reading apparatus for reading an image of an original, comprising:

image reading means for reading the image of the original, said image reading means including a movable member for scanning said original;

drive means for driving said movable member;

first position setting means for setting a first position where said movable member starts scanning;

means for supplying a drive signal to said drive means to cause reciprocating movement of said movable member with respect to said first position;

second position detecting means for detecting a second position where said movable member terminates the reciprocating movement;

abnormality detecting means for measuring a data related to a difference between said first and second positions, comparing the measured data with a first predetermined value, and detecting abnormality of said apparatus when said measured data exceeds said first predetermined value.

8. An image reading apparatus in accordance with claim 7, further comprising detecting means for detecting presence of said movable member in an initial position, and said drive means includes a stepping motor, said signal supply means generates a periodic pulse signal, said first position setting means sets the first position based on a preset number of pulses, said number of pulses being the number of pulses necessary for driving said movable member from said initial position to said first position, and said second position detecting means counts the number of pulses necessary for driving said movable member from said second position to said initial position.

9. An image reading apparatus in accordance with claim 8, further comprising means for stopping the movement of said movable member caused by said drive means, when said detecting means detects said movable member during scanning.

10. An image reading apparatus in accordance with claim 7, wherein said second position detecting means detects said second position after a predetermined time from an end of the reading of said image.

11. An image reading apparatus in accordance with claim 7, further comprising means for instructing a start of detecting operation of said second position detecting means.

12. An image reading apparatus in accordance with claim 7, further comprising means for changing a scanning condition of said movable member in response to the detection of the abnormality by said abnormality detecting means.

13. An image reading apparatus in accordance with claim 12, wherein said scanning condition changing means decreases a maximum value of a scanning speed of said movable member.

14. An image reading apparatus in accordance with claim 12, wherein said scanning condition changing means decreases a maximum value of a speed of return of said movable member.

15. An image reading apparatus in accordance with claim 12, wherein
said scanning condition changing means forbids operation of said movable member.

16. An image reading apparatus in accordance with claim 12, further comprising
means for displaying a change of the scanning condition by said scanning condition changing means.

17. An image reading apparatus in accordance with claim 12, further comprising
control means for controlling said drive means to cause reciprocating movement of said movable member with reference to said first position under the scanning condition changed by said scanning condition changing means,
third position detecting means for detecting a third position where said movable member terminates the reciprocating movement, and
abnormality detecting means for detecting abnormality of said apparatus when a data related to difference between said first and third positions exceeds a second predetermined value, 18. An image reading apparatus in accordance with claim 17, wherein
said third position detecting means detects said third position in response to a first image reading request after the change of said scanning condition.

19. An image reading apparatus in accordance with claim 17, wherein
said third position detecting means detects said third position each time before reading of said image after the change of said scanning condition.

20. An image reading apparatus in accordance with claim 7, further comprising
scanning condition limiting means for comparing said measured data with a third predetermined value when said abnormality detecting means detects abnormality, and limiting a moving speed of said movable member when said measured data does not exceed said second predetermined value.

21. An image reading apparatus in accordance with claim 7, further comprising
for comparing said difference with a second predetermined value when said abnormality detecting means detects abnormality, and forbidding operation of said movable member when said difference exceeds said second predetermined value.

22. An image reading apparatus for reading an image of an original, comprising:
image reading means for reading the image of the original by scanning said original;
original placing member where said original is placed, and moving together with said original;
drive means for moving said original placing member;
first position setting means for setting a first position where scanning of said original starts;
means for supplying a drive signal to said drive means to cause reciprocating movement of said original placing member with reference to said first position;
second position detecting means for detecting a second position where said original placing member terminates the reciprocating movement; and
abnormality detecting means for detecting abnormality of said apparatus when a data related to a difference between said first and second positions exceeds a first predetermined value.

23. A color copying apparatus for reading an image of a color original a plurality of times for respective colors, forming a color image, and changing a copy magnification by changing a scanning speed, comprising:
image reading means for reading the image of the original, said image reading means including a movable member for scanning said original;
driving means for driving said movable member;
first position setting means for setting a first position where said movable member starts scanning;
means for supplying a drive signal to said drive means to cause reciprocating movement of said movable member with respect to said first position;
second position detecting means for detecting a second position where said movable member terminates the reciprocating movement;
abnormality detecting means for measuring a data related to a difference between said first and second positions, comparing the measured data with a first predetermined value, and detecting abnormality of said movable member when said measured data exceeds said first predetermined value; and
means for changing a copy condition in response to the detection of abnormality by said abnormality detecting means.

24. A color copying apparatus in accordance with claim 23, wherein
said color copying apparatus is capable of changing a reduction copy magnification, and
said copy condition changing means limits changeable values for said reduction copy magnification.

* * * * *